July 27, 1937.   W. A. HEINRICH   2,088,414
ELECTRICAL CONNECTER
Filed Sept. 28, 1933
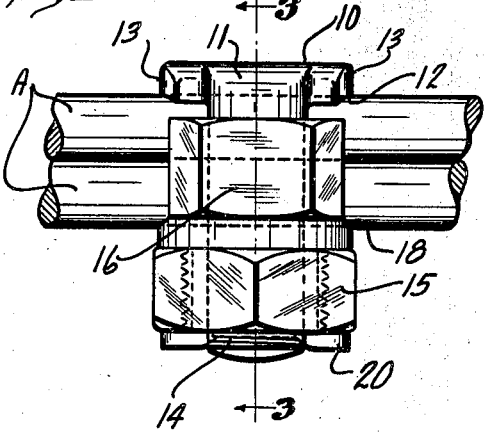
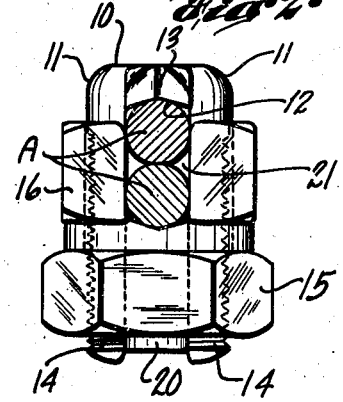
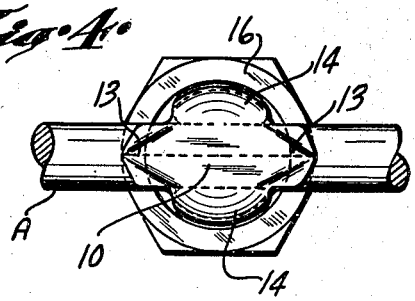
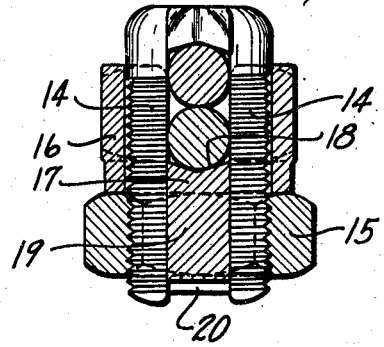
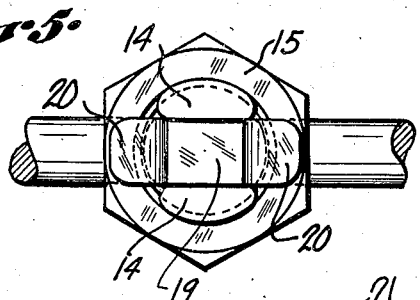
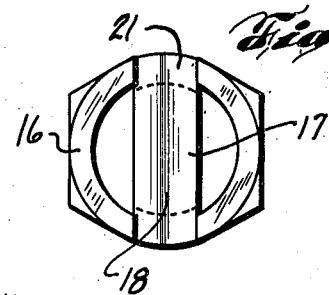
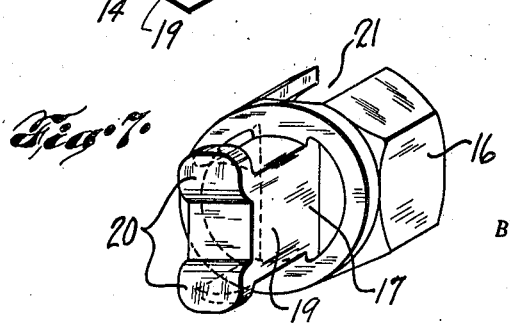
INVENTOR.
WALTER A. HEINRICH
BY
ATTORNEY.

Patented July 27, 1937

2,088,414

UNITED STATES PATENT OFFICE 2,088,414

ELECTRICAL CONNECTER

Walter A. Heinrich, St. Louis, Mo., assignor to James R. Kearney Corporation, St. Louis, Mo., a corporation of Missouri Application September 28, 1933, Serial No. 691,266

3 Claims. (Cl. 173—263)

My invention relates to electrical connecters and more particularly to an improved connecter of so-called split bolt and nut type. This type of connecter consists, essentially, in a bolt having a longitudinally slotted shank portion, through which extend the conductors or other members to be connected, and a nut threaded on the outer end of the shank portion for clamping the members together. In an advanced design, the device is provided with a spacer element, which is disposed between, and prevents collapse of the shank furcations when the nut is drawn up tightly on the bolt. Owing to their simplicity, economy of manufacture, and facility of application, these devices have come into widespread use for installations requiring a sturdy yet inexpensive connection between a pair or more of conductors.

While split bolt connecters of current design are generally satisfactory for their intended purpose, they have an inherent weakness which is manifested by a twisting, distorting, or warping of the shank furcations when forces of sufficient magnitude to produce an extremely tight connection between the conductors are employed in turning up the nut on the bolt shank. The reason for this undesirable condition will appear from the following. In applying split bolt connecters of heretofore prevailing design, it is customary to utilize a pair of wrenches, one applied to the bolt head to preclude turning of the bolt, hence kinking or bending of the conductors, as the second wrench is applied to the clamping nut. Of course the bolt shank is not subjected to any substantial tortional stress while the nut is free to turn. However, when the nut is drawn up and clamping action occurs, the turning forces on the nut are imparted to the bolt. Since there is a substantial distance between the points of application of the turning couples, the shank portions of the bolt, to which the turning or twisting forces are imparted, are readily susceptible of being warped or distorted. Such distortion of the bolt shank results in the conductors being turned out of parallelism, with the attendant reduction of contact surface therebetween, the stripping of the bolt or nut threads, and in permanent impairment of the connecter for subsequent use on other installations.

An object of my invention is to provide an improved connecter of split bolt type which is capable of withstanding, without damage thereto, extremely large forces utilized in applying the device, and hence which is adapted to clamp conductors with much greater pressure than can corresponding devices of prevailing construction and commensurate size.

The aforementioned object is attained by the provision of a washer element, disposed between the clamping nut and its adjacent conductor, having means which prevent rotation of the element relative to the bolt, and other means forming wrench engaging surfaces. In the connecter embodying the present invention the bolt is adapted to be held against rotation while the clamping nut is tightened thereon, by a wrench or other suitable tool which engages the washer element and not the bolt head as is the usual practice when installing split bolt connecters of former constructions. Obviously, since the oppositely directed clamping forces are applied respectively to the nut and washer element, which parts are disposed in relative adjacence, such forces may be of very great magnitude without causing distortion of the shank furcations. By reason of the aforementioned construction, the bolt shank is practically relieved of all tortional strain.

Other objects and advantages of the present invention will appear from the following detailed description and accompanying drawing, in which:

Fig. 1 is a side elevation showing a presently preferred embodiment of my invention as applied to a pair of electrical conductors; Fig. 2 illustrates the assembly of Fig. 1 as viewed in a direction longitudinally of the conductors; Fig. 3 is a sectional view of the assembly taken at a plane indicated by the line 3—3 of Fig. 1; Figs. 4 and 5, respectively, are top and bottom plan views of the assembly illustrated in Fig. 1, and Figs. 6 and 7, respectively, are top plan, and perspective views of a presently preferred form of washer or spacer element employed in the device of my invention.

Proceeding now with a detailed description of my invention as embodied in the device illustrated, and referring to the drawing by characters of reference, numeral 10 denotes the head portion of a longitudinally slotted, or bifurcated bolt. As distinguished from the polygonal head portions of the common variety of bolts, the portion 10 is preferably formed with well rounded edges as indicated at 11, and is substantially free of any flat side surfaces. This construction has been adopted primarily for the purpose of discouraging the user from applying a wrench to the bolt head instead of the washer element to be hereinafter described. The bolt slot terminates in a preferably V-shaped wire-receiving groove 12, shown as extending transversely of the inside surface of the head portion 10 and continuing along the under surfaces of lugs 13 which project laterally from opposite sides of the bolt head.

As best appears from Fig. 1, the bolt or body member is adapted to be positioned in straddling relation to the members to be clamped together, such members being exemplified by the wires A. Threaded on the shank portions or furcations 14 is a nut 15 upon which is seated a washer element 16. The element 16 is of substantial thickness, or depth, and is preferably provided with flat outer surfaces, in the manner of a common nut, to enable the element to be firmly gripped by a wrench or other tool. Extending diametrally across the element 16 at its lower or outer end is a bridge portion, or rib 17 of width approximating the width of the bolt slot through which it extends. Formed in the upper surface of the rib 17 is a longitudinal wire-receiving groove 18. A downward or outward continuation of the rib 17 forms a plug-like projection 19 which extends into and substantially fills that portion of the bolt slot which is encompassed by the nut. There is a normal tendency of the shank furcations 14 to collapse or bend inwardly when the nut is drawn up tightly thereon and such result is prevented by the portion 19 which serves as a spacer to maintain the furcations in their normal positions.

For purposes of minimizing the number of separable connecter parts, the nut and washer elements are preferably maintained in permanently assembled relation by the provision, on the plug or spacer portion 19, of laterally projecting ears 20 which underlie the outer face of the nut and prevent detachment of that member from the washer element 16.

The upper or inner end of the washer is diametrally kerfed to the depth of the wire seat 18, forming lateral slots or openings 21 which are located in registration with the bolt slot, and such openings, with the bolt slot, provide an unobstructed wire passage between wire grooves 12 and 18.

It will appear that the washer element 16 is free to move along the shank furcations responsive to threading or unthreading of the nut on the bolt, but is held against rotation relative thereto. It will further appear that the bolt head 10 is adapted to be drawn into the washer, the lugs 13 being received by the slots 21, when such becomes necessary to clamp wires of relatively smaller diameter than those illustrated.

From the foregoing description it may be seen that I provide a connecter that can be tightened to a considerably greater degree than prevailing types for the reason that the upper portion of the bolt is not subject to tortional stresses, as the nut is being drawn up on the bolt furcations.

Since the construction herein set forth is capable of a certain range of change and modification without materially departing from the spirit of the invention, I do not limit myself to the specific structure shown and described except as hereinafter claimed.

I claim:

1. A connecter comprising a bolt having a slot formed longitudinally thereof which extends from a bridge portion adjacent to one end of the bolt to the opposite end of the bolt where said slot is open, a nut mounted on said bolt, and a substantially cylindrical sleeve mounted on the bolt in contact with said nut and having a plurality of external, angularly disposed tool-receiving faces which encompass the sleeve, said sleeve having a diametral bridge portion at one end which is extended through the bolt slot, and being provided with diametrally opposed slots located in the plane of the bolt slot which extend from the bridge portion of the sleeve to the opposite end thereof where said slots are open, the tool-receiving faces of said sleeve being spaced apart from the nut longitudinally of the bolt so as to permit of convenient application of separate tools to the sleeve and the nut.

2. A connecter comprising a bolt having a slot formed longitudinally thereof which extends from a bridge portion adjacent to one end of the bolt to the opposite end of the bolt where said slot is open, a nut mounted on said bolt, and a substantially cylindrical sleeve mounted on the bolt in contact with said nut and having external tool-receiving faces, said sleeve having a diametral bridge portion at one end which is extended through the bolt slot, and being provided with diametrally opposed slots located in the plane of the bolt slot which extend from the bridge portion of the sleeve to the opposite end thereof where said slots are open, said bolt being of such shape and size at the bridge end thereof that said bolt end may pass entirely into the interior of the sleeve when the diameters of elements being connected require such movement.

3. A connecter comprising a bolt having a slot formed longitudinally thereof which extends from a bridge portion adjacent to one end of the bolt to the opposite end of the bolt where said slot is open, a nut mounted on said bolt, and a substantially cylindrical sleeve mounted on the bolt in contact with said nut and having external tool-receiving faces, said sleeve having a diametral bridge portion at one end which is extended through the bolt slot, and being provided with diametrally opposed slots located in the plane of the bolt slot which extend from the bridge portion of the sleeve to the opposite end thereof where said slots are open, said bolt being of such shape and size at the bridge end thereof that said bolt end may pass entirely into the interior of the sleeve when the diameters of elements being connected require such movement, and said bolt end being provided with extended portions which, on movement of the bridge end of the bolt into the interior of the sleeve, move into the slots of the sleeve.

WALTER A. HEINRICH.